(12) United States Patent
Ogasawara et al.

(10) Patent No.: US 7,926,636 B2
(45) Date of Patent: Apr. 19, 2011

(54) TWIN CLUTCH APPARATUS FOR POWER UNIT, POWER UNIT INCORPORATING SAME, AND VEHICLE INCORPORATING SAME

(75) Inventors: Atsushi Ogasawara, Saitama (JP); Yoshiaki Tsukada, Saitama (JP); Junya Watanabe, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 415 days.

(21) Appl. No.: 12/154,697

(22) Filed: May 27, 2008

(65) Prior Publication Data

US 2008/0296082 A1 Dec. 4, 2008

(30) Foreign Application Priority Data

May 31, 2007 (JP) .................................. 2007-144603

(51) Int. Cl.
*F16D 25/10* (2006.01)
*F16D 13/52* (2006.01)
(52) U.S. Cl. .................. 192/48.611; 192/48.8; 192/70.2
(58) Field of Classification Search ............. 192/48.611, 192/70.19, 70.2, 85.43
See application file for complete search history.

(56) References Cited

U.S. PATENT DOCUMENTS

| 2,720,298 A | * | 10/1955 | Youngren et al. ........... 192/99 A |
| 5,765,673 A | * | 6/1998 | Nishiyama et al. ........ 192/85.41 |
| 6,719,114 B2 | * | 4/2004 | Kumagai et al. ............. 192/70.2 |
| 2007/0144858 A1 | * | 6/2007 | Ieda et al. .................... 192/48.8 |
| 2008/0087119 A1 | * | 4/2008 | Shiozaki ......................... 74/330 |

FOREIGN PATENT DOCUMENTS

JP 07-238951 A 9/1995

* cited by examiner

*Primary Examiner* — Richard M. Lorence
(74) *Attorney, Agent, or Firm* — Carrier Blackman & Associates, P.C.; William D. Blackman; Joseph P. Carrier (57) ABSTRACT

A twin clutch apparatus includes a first clutch, a second clutch, and a clutch outer member shared by the first and second clutches. The clutch outer member has groove portions formed therein having a width that gradually increases towards an open-end side of the clutch outer member. A width of each protruding portion formed in friction plates of the second clutch disposed towards the open-end side of the clutch outer member is greater than a width of each protruding portion formed in friction plates of the first clutch disposed towards a closed-end side of the clutch outer member. The twin clutch apparatus, during operation thereof, is operable to control a clearance between groove portions of the clutch outer member and protruding portions of friction plates within a desirable range, to reduce force and sound produced by an impact between the clutch outer member and the friction plates.

20 Claims, 5 Drawing Sheets

TWIN CLUTCH APPARATUS FOR POWER UNIT, POWER UNIT INCORPORATING SAME, AND VEHICLE INCORPORATING SAME

CROSS-REFERENCE TO RELATED APPLICATIONS

The present application claims priority under 35 USC §119 based on Japanese patent application No. 2007-144603 filed on May 31, 2007. The entire subject matter of this priority document is incorporated by reference herein.

BACKGROUND OF THE INVENTION

1. Field of the Invention

The present invention relates to a clutch apparatus operable to engage and disengage transmission of a rotational drive power from a crankshaft of an engine to a transmission unit of a power unit. More particularly, the present invention relates to a twin clutch apparatus having a pair of clutches and a clutch outer member shared by the pair of clutches, a power unit incorporating same, and a vehicle incorporating same.

2. Description of the Background Art

There are a number of known clutch apparatus which are operable to engage and disengage transmission of a rotational drive power from an engine to a transmission unit of a power unit. Such known clutch apparatus generally include a friction plate and a clutch outer member.

The friction plate includes multiple protruding portions formed thereon. The protruding portions are arranged in the circumferential direction on the edge of the outer circumferential surface of the friction plate so as to protrude in a radial direction thereof.

The clutch outer member includes multiple groove portions formed therein. The multiple groove portions are arranged along the axial direction in an internal circumferential surface of the clutch outer member. The clutch outer member has a cylindrical shape having a closed bottom end.

The protruding portions of the friction plate are engaged with respective groove portions of the clutch outer member with a clearance between each protruding portion and groove portion. Accordingly, the friction plate is engaged with the clutch outer member, and the friction plate is allowed to move in the axial direction, but is not allowed to rotate independently of the clutch outer member.

An example of such known clutch apparatus is disclosed in the Japanese Patent Application Publication No. H07-238951, which discloses a single clutch apparatus. However, the Japanese Patent Application Publication No. H07-238951 does not disclose a twin clutch apparatus having a pair of clutches, as proposed by the present invention.

Further, in an ordinary twin clutch apparatus, a demand for reducing the number of component, parts, mainly requires that the pair of clutches share a single, common clutch outer member. As a result, when a single, common clutch outer member is shared by a pair of clutches, length of the clutch outer member in the axial direction increases, and so do the lengths of the groove portions formed in the clutch outer member.

When such a clutch outer member having an elongated longitudinal dimension (length) in the axial direction is fabricated, additional measures are required to facilitate pulling out of the core for forming the groove portion in the clutch outer member. Each of the groove portions is formed in a tapered shape with a radial width thereof gradually increasing towards an open-end side of the clutch outer member.

However, the tapered shape of the groove portion formed in the clutch outer member having a radial width thereof gradually increasing, as described above, forms a clearance between the groove portion of the clutch outer member and the protruding portion of the friction plate which increases towards the open-end side of the clutch outer member.

As a result, the groove portion near the open-end side of the clutch outer member has the largest clearance. This would cause little problem, if any, if a clutch apparatus has a short length in the axial direction, such as the single-clutch apparatus disclosed in the Japanese Patent Application Publication No. H07-238951.

However, when a twin clutch apparatus having a single, commonly shared clutch outer member, the clearance between the groove portion of the clutch outer member and the protruding portion of one of the pair of clutches that is placed towards the open-end side increases because of the increased length of the clutch outer member in the axial direction. As a result, both undesirable force and sound caused by the impact between the clutch outer member and the friction plate is increased.

The present invention has been made to overcome such drawbacks. Accordingly, it is an object of the present invention is to provide a twin clutch apparatus that is operable to control a clearance between the groove portion of the clutch outer member and the protruding portion of the friction plate within an appropriate, desirable range, even when the width of the groove portion of the clutch outer member is increased. It is also an object of the present invention to provide the twin clutch apparatus which reduces force and sound caused by the impact during operation between the clutch outer member and the friction plate.

SUMMARY OF THE INVENTION

In order to achieve above objects, the present invention according to a first aspect thereof provides a twin clutch apparatus including a pair of clutches disposed between a crankshaft and a transmission unit. The pair of clutches are operable to engage and disengage transmission of a rotational driving power from the crankshaft to the transmission unit. The clutches are arranged side by side with each other on a same axial line. Each of the pair of clutches includes at least one friction plate having multiple protruding portions, formed on the outer circumferential edge thereof, and protruding in a radial direction thereof.

The twin clutch apparatus also includes a clutch outer member shared by the pair of clutches. The clutch outer member has a cylindrical shape having a closed bottom end portion defining a closed-end side, and the open ended portion defining an open-end side. The clutch outer member has a plurality of groove portions formed therein extending in an axial direction in the internal circumferential surface thereof.

The friction plate is engaged with the clutch outer member by engaging (fitting) the protruding portions thereof with the groove portions of the clutch outer member. When friction plate is engaged with the clutch outer member, there is a clearance (space) formed between the protruding portions thereof with the groove portions of the clutch outer member. Accordingly, the friction plate is operable to move in the axial direction, but is not operable to rotate independently of the clutch outer member.

The twin clutch apparatus of the present invention has the following characteristics. Each of the groove portions is formed so as to have a width that is gradually increasing towards the open-end side of the clutch outer member. One of the pair of clutches is disposed on the open-end side of the clutch outer member, and another one of the pair of clutches is disposed on the closed-end side of the clutch outer member. The width of each of the protruding portions formed in the friction plate of the clutch disposed towards the open-end side of the clutch outer member is greater than that of each of the protruding portions formed in the friction plate of the clutch disposed on the closed-end side of the clutch outer member.

The present invention according to a second aspect thereof, in addition to the first aspect, is characterized in that the friction plate of one of the pair of clutches that is connected to a first speed gear train of a gear transmission mechanism is thicker than the friction plate of the other of the pair of clutches.

The present invention according to a third aspect, in addition to the second aspect, is characterized in that the one of the pair of clutches that is connected to the first speed gear train is disposed on the open-end side of the clutch outer member.

EFFECTS OF THE INVENTION

According to the twin clutch apparatus of the first aspect, each of the groove portions is formed so as to have a width that is gradually increasing towards the open-end side of the clutch outer member. In addition, one of the pair of clutches is disposed on the open-end side of the clutch outer member, and another one of the pair is disposed on the closed-end side of the clutch outer member. Moreover, the width of each of the protruding portions formed in the friction plate of the clutch disposed on the open-end side is greater than that of each of the protruding portions formed in the friction plate of the clutch disposed on the closed-end side.

Here, the pair of clutches shares a single, common clutch outer member. This results in increasing the width of each of the groove portions of the clutch outer member. In order to accommodate increasing width of the groove portions, the width of each protruding portion of the friction plate is increased (i.e., made larger) to fit even to the widened groove portions of the outer clutch member. Accordingly, the clearance between each groove portion of the clutch outer member and the protruding portion of the friction plate is controlled within an appropriate, desirable range. Therefore, force and sound caused by the impact between the clutch outer member and the friction plates can be significantly reduced.

According to the twin clutch apparatus of the second aspect, the friction plate of the one of the pair of clutches, which is operatively connected with the first speed gear train, is thicker than the friction plate of the other of the pair of clutches. Thus, during the deceleration or at the start operation of the vehicle, even when a heavier load is applied to the one of the pair of clutches that is connected to the first speed gear train, and the protruding portions formed in the friction plate of the one of the pair of clutches hit (engage) the groove portions of the clutch outer member, an improvement can be achieved in the durability of the protruding portions of the friction plate due to their higher thickness.

According to the twin clutch apparatus of the third aspect, the one of the pair of clutches that is connected to the first speed gear train is disposed towards the open-end side of the clutch outer member. Accordingly, while a heavier load is applied, during the deceleration or at the start of the vehicle, to each friction plate of the one of the pair of clutches that is connected to the first speed gear train, the friction plate can be made thicker.

In addition, each of the protruding portions formed in the friction plate of the one of the pair of clutches can be made larger than each of the protruding portions formed in the friction plate of the other one of the pair of clutches. Thus, even when the protruding portions formed in the friction plate of the one of the pair of clutches that is connected to the first speed gear train hit the groove portions of the clutch outer member, an improvement can be achieved in the durability of the protruding portions.

For a more complete understanding of the present invention, the reader is referred to the following detailed description section, which should be read in conjunction with the accompanying drawings.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Hereinbelow, illustrative embodiments of a twin clutch apparatus of the present invention, a power unit incorporating same, and a vehicle incorporating same are described in detail with reference to the accompanying drawings.

Figure 1:
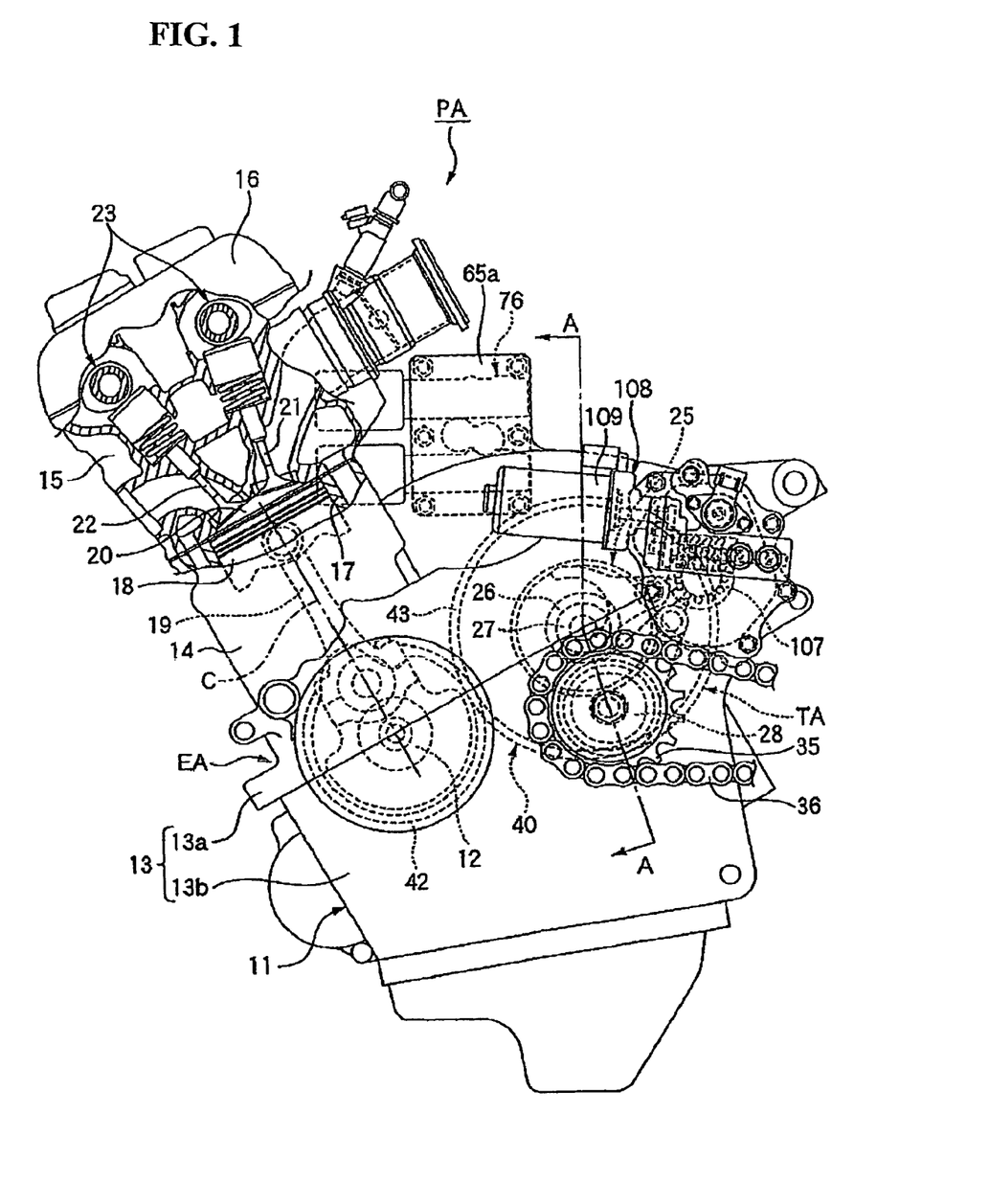
FIG. 1 is a partially cutaway left-hand side view of a power unit having a twin clutch apparatus according to the present invention.
Figure 2:
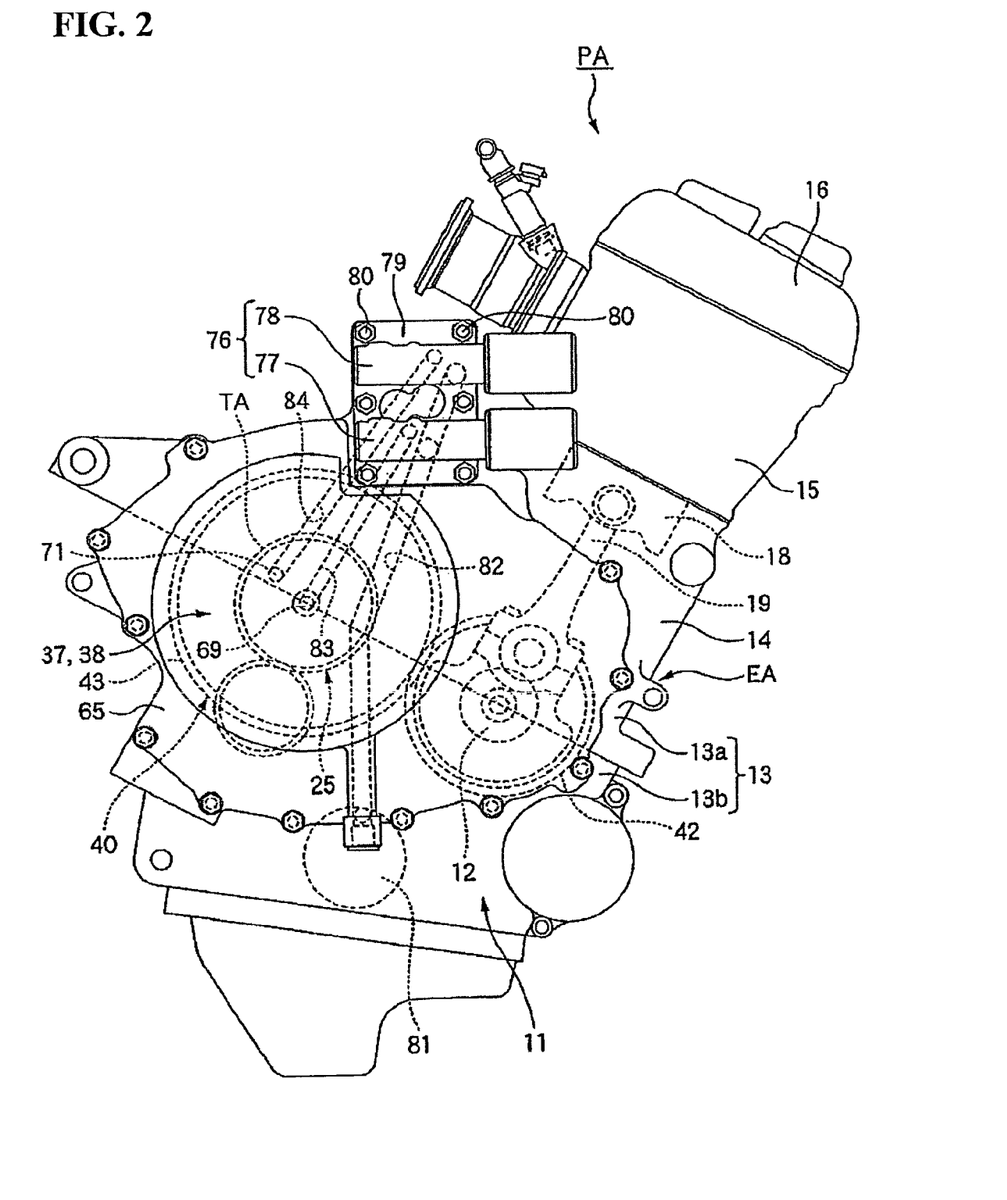
FIG. 2 is a right-hand side view of the power unit shown in FIG. 1.
Figure 3:
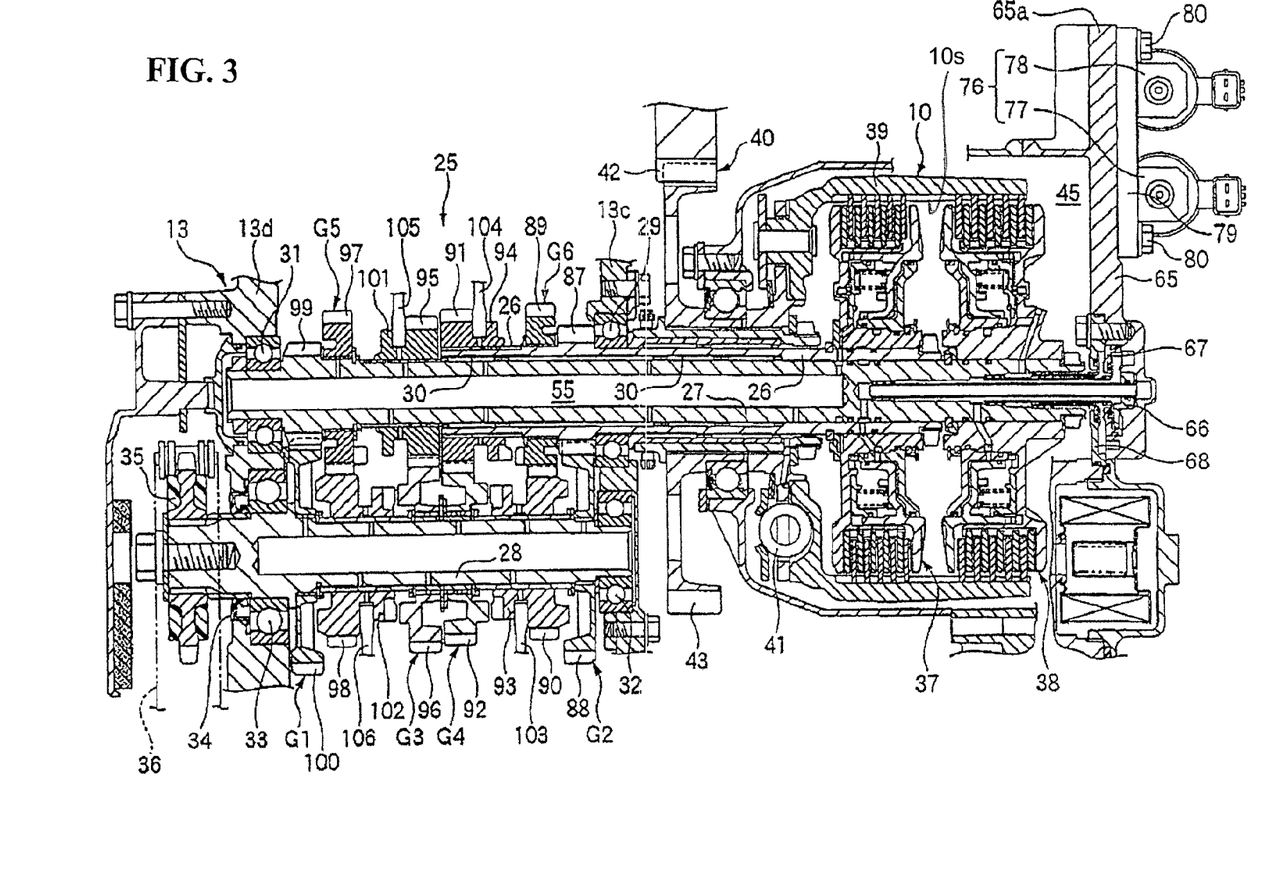
FIG. 3 is a sectional view taken along the line A-A and viewed as indicated by the arrow in FIG. 1.
Figure 4:
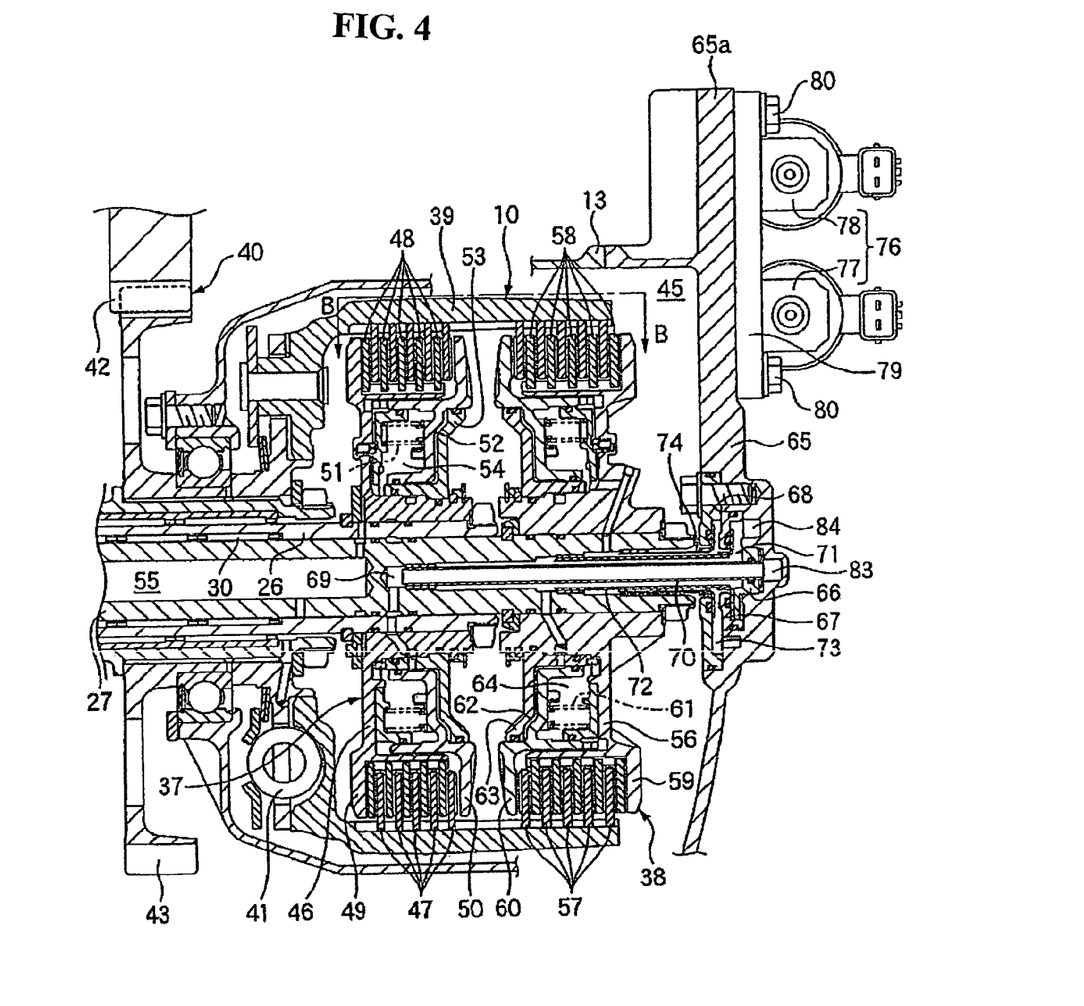
FIG. 4 is an enlarged view of the principal portion of the twin clutch apparatus shown in FIG. 3.
Figure 5:
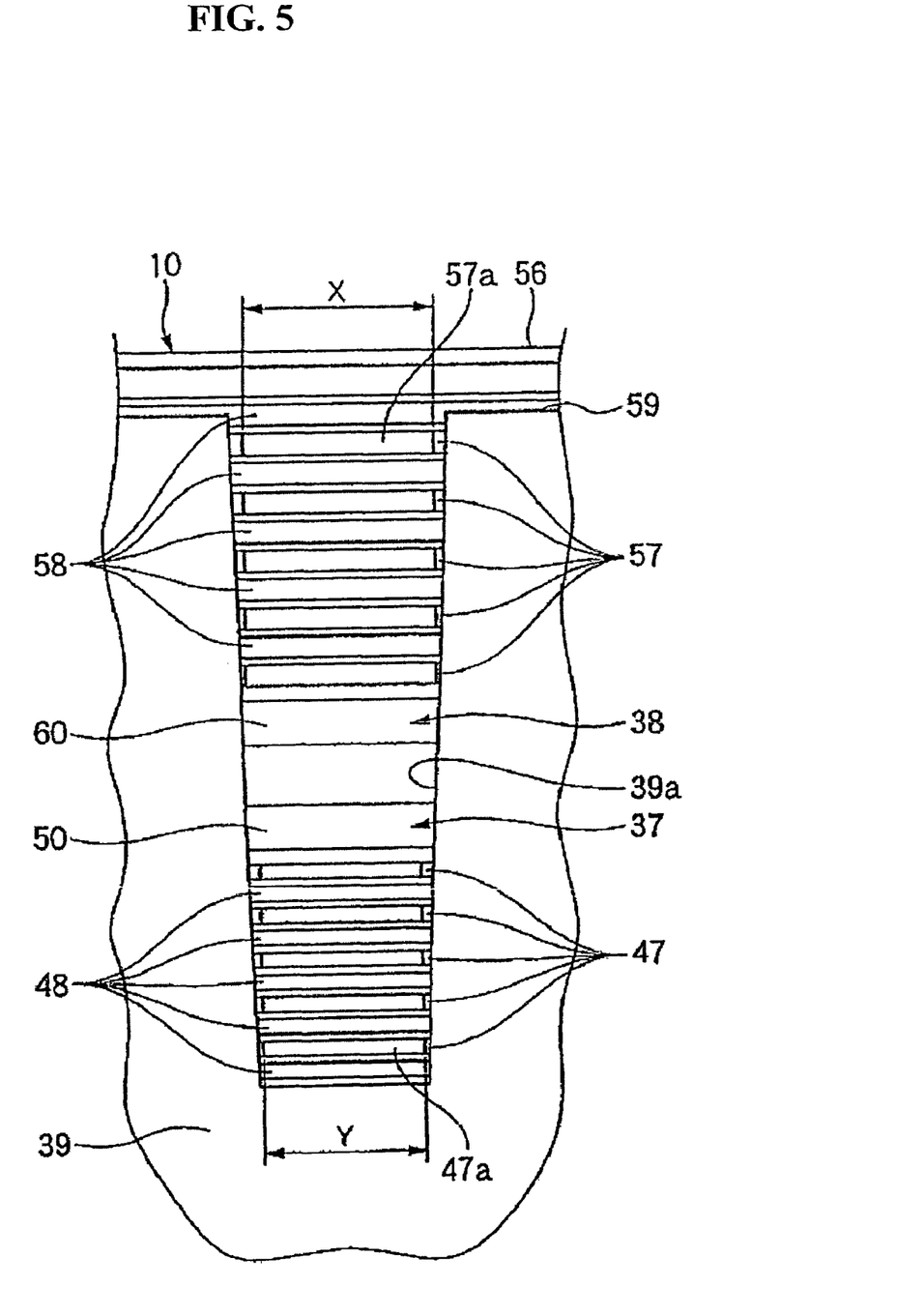
FIG. 5 is a representative view in a direction of arrow B-B in FIG. 4.

FIG. 1 is a partially cutaway left-hand side view of a power unit on which a twin clutch apparatus according to the present invention is mounted. FIG. 2 is a right-hand side view of the power unit shown in FIG. 1. FIG. 3 is a sectional view taken along a line A-A, and viewed as indicated by the arrow in FIG. 1. FIG. 4 is an enlarged view of the principal portion of the twin clutch apparatus shown in FIG. 3. FIG. 5 is a representative view in a direction of arrow B-B in FIG. 4.

As shown in FIGS. 1 and 2, a power unit PA includes an engine EA and a transmission unit TA operable to convert speed of rotational drive power of the engine EA to a desired rotational speed for driving a vehicle. The power unit PA is mounted, for example, on a motorcycle.

The engine EA includes an engine main body 11 having a crankcase 13, a cylinder block 14, a cylinder head 15, and a head cover 16. The crankcase 13 rotatably supports a crankshaft 12 therein. The crankshaft 12 is arranged along a widthwise direction of the motorcycle. The cylinder block 14 is operatively attached to the crankcase 13. The cylinder block includes at least one cylinder bore 17 having a piston 18 disposed therein. The piston 18 axially slides within the cylinder bore 17. The piston 18 is operatively attached to the crankshaft 12 via a connecting rod 19. The cylinder head 15 is operatively attached to the cylinder block 14 to form a combustion chamber 20 therebetween facing a top portion of the piston 18. The head cover 16 is attached to the cylinder head 15.

The crankcase 13 includes an upper case half 13a and a lower case half 13b connected to each other. The upper case half 13a is formed integrally with the cylinder block 14. An axial line of the crankshaft 12 is located on a plane where the upper case half 13a and the lower case half 13b are joined together.

The cylinder bore 17 has an axial line C that is inclined upwards to a front side of the motorcycle when the engine EA is mounted on the motorcycle. An inlet valve 21 and an exhaust valve 22 are disposed in the cylinder head 15, and are operable to communicate (e.g., open/close) with the combustion chamber 20. A valve system 23, which operates the inlet and the exhaust valves 21 and 22, is disposed between the cylinder head 15 and the head cover 16.

As shown in FIG. 3, the transmission unit TA includes a gear transmission mechanism 25, and a twin clutch apparatus 10 (also referred as a twin clutch assembly 10 or a clutch assembly 10) of the present invention disposed between the gear transmission mechanism 25 and the crankshaft 12. The twin clutch apparatus 10 is operable to engage and disengage power transmission from the crankshaft 12 to the gear mechanism 25 in an operating response, i.e., whether a hydraulic pressure is applied thereto or released. The twin clutch apparatus 10 is installed in a middle portion of a power-transmission arrangement through which the rotational driving power of the crankshaft 12 is transmitted to a driving wheel of a vehicle.

The gear transmission mechanism 25 is disposed in the crankcase 13. The gear transmission mechanism 25 includes a plurality of gear trains for achieving multiple driving speeds. The gear trains that can be selectively established include, for example, a first to sixth speed gear trains G1, G2, G3, G4, G5, and G6.

In the gear transmission mechanism 25, the second, the fourth, and the sixth speed gear trains, G2, G4, and G6 are disposed between a first main shaft 26 and a counter shaft 28 operatively connected to the driving wheel; while the first, the third, and the fifth speed gear trains G1, G3, and G5 are provided between the counter shaft 28 and a second main shaft 27 that penetrates coaxially the first main shaft 26. It may be noted that the second main shaft 27 is capable of freely rotating independently of the first main shaft 26.

As shown in FIG. 3, the crankcase 13 includes a pair of sidewall 13c and 13d, which face each other with a certain distance therebetween in an axial direction of the crankshaft 12. The first main shaft 26 has a cylindrical shape with its axial line being arranged parallel to the crankshaft 12. An intermediate portion of the first main shaft 26 penetrates the sidewall 13c with the first main shaft 26 being allowed to rotate freely, and a ball bearing 29 disposed between the first main shaft 26 and the sidewall 13c.

While the second main shaft 27 with its axial line being in parallel to the crankshaft 12 maintains a constant position relative to the first main shaft 26 in the axial direction. The second main shaft 27 penetrates the first main shaft 26. The second main shaft is operable to rotate independently of the first main shaft 26. A multiple needle bearings 30 are disposed between the first main shaft 26 and the second main shaft 27. In addition, the opposite end portion of the second main shaft 27 is movably supported by the sidewall 13d of the crankcase 13, and is operable to rotate freely with a ball bearing 31 disposed therebetween.

The counter shaft 28 with its axial line being in parallel to the crankshaft 12 has one end portion movably supported by the sidewall 13c of the crankcase 13 and is operable to rotate freely with a ball bearing 32 installed therebetween. Meanwhile, the other end portion of the counter shaft 28 is movably supported by the sidewall 13d of the crankcase 13 and is operable to rotate freely with a ball bearing 33 installed therebetween. Moreover, a ring-shaped seal member 34 is disposed between the other end portion of the counter shaft 28 and the sidewall 13d of the crankcase 13. Additionally, the counter shaft 28 penetrates the sidewall 13d, and a portion of the counter shaft 28 sticks out of the sidewall 13d. At the end of the portion sticking out of the counter shaft 28, a drive sprocket 35 is fixed with a chain 36 wrapped around for transmitting the driving power to the driving wheel.

FIGS. 3 and 4 show a clutch cover 65 attached to the right-hand side portion of the crankcase 13. The twin clutch apparatus 10 is installed in a clutch chamber 45 formed between the crankcase 13 and the clutch cover 65.

As shown in FIG. 4, the twin clutch apparatus 10 includes a first clutch 37 and a second clutch 38 that are disposed side by side with each other on a common axial line of the first and the second main shafts 26 and 27. The twin clutch apparatus 10 also includes a clutch outer member 39, which is shared by the first clutch 37 and the second clutch 38.

The first clutch 37 is disposed between the crankshaft 12 and one end portion of the first main shaft 26; while the second clutch 38 is disposed between the crankshaft 12 and one end portion of the second main shaft 27. The rotational driving power from the crankshaft 12 is inputted to the first and second clutches 37 and 38 via a primary reduction apparatus 40 and a damper spring 41.

The driving power thus inputted to the first clutch 37 is then transmitted to the second, the fourth, and the sixth speed gear trains G2, G4, and G6 via the first main shaft 26. While, the driving power thus inputted to the second clutch 38 is then transmitted to the first, the third, and the fifth speed gear trains G1, G3, and G5 via the second main shaft 27.

The primary reduction apparatus 40 includes a drive gear 42 disposed on the crankshaft 12, and a driven gear 43 which meshes with the drive gear 42. The driven gear 43 is movably supported by the first main shaft 26, and is capable of rotating independently of the first main shaft 26. The driven gear 43 is coupled to the clutch outer member 39 with the damper spring 41 disposed therebetween.

The first clutch 37 is connected to the second, the fourth, and the sixth speed gear trains G2, G4, and G6 via the first main shaft 26.

As shown in FIG. 4, the first clutch 37 includes the clutch outer member 39, a first clutch inner member 46, multiple first friction plates 47, multiple second friction plates 48, a first pressure-receiving plate 49, a first pressure plate 50, and a first coil spring 51. The first clutch inner member 46 is surrounded coaxially by the clutch outer member 39, and is coupled to the first main shaft 26 such that it is inoperable to rotate independently of the first main shaft 26. The first friction plates 47 are engaged with the clutch outer member 39 while the first friction plates 47 are inoperable to rotate independently of the clutch outer member 39, but are operable to move in the axial direction.

The second friction plates 48 are engaged with the first clutch inner member 46, while the second friction plates 48 are inoperable to rotate independently of the first clutch inner member 46, but are operable to move in the axial direction. The first friction plates 47 and the second friction plates 48 are laid alternately over one another.

The first pressure-receiving plate 49 is disposed on the first clutch inner member 46 so as to alternately face laid over the first friction plates 47 and the second friction plates 48. The first pressure plate 50 and the first pressure-receiving plate 49 sandwich the first friction plates 47 and the second friction plates 48 therebetween. The first coil spring 51 biases the first pressure plate 50 towards a side in the axial direction where the first pressure plate 50 is positioned more away from the first pressure-receiving plate 49.

An end-wall member 53 is fixed onto the first clutch inner member 46. A first hydraulic chamber 52 facing the back-side surface of the first pressure plate 50 is formed between the end-wall member 53 and the first pressure plate 50. As the hydraulic pressure in the first hydraulic chamber 52 increases, the first pressure plate 50 acts so as to pressure the first friction plates 47 and the second friction plates 48 between the first pressure plate 50 and the first pressure-receiving plate 49. Accordingly, the first clutch 37 gets engaged to the first main shaft 26 so as to transmit the rotational driving power from the crankshaft 12 to the first main shaft 26.

In addition, a canceller chamber 54 facing the front-side surface of the first pressure plate 50 is formed between the first clutch inner member 46 and the first pressure plate 50. The first coil spring 51 is installed in the canceller chamber 54 while the capacity of the first hydraulic chamber 52 is reduced as a result of the spring force of the first coil spring 51.

Moreover, the canceller chamber 54 is communicably connected to a first oil passage 55. The first oil passage 55 is formed coaxially in the second main shaft 27 in order to supply the lubricant oil to every part that needs to be lubricated and to the interstice between the first and second main shafts 26 and 27.

Here, centrifugal force due to the rotation acting on the oil in the first hydraulic chamber 52 under reduced pressure might cause a force making the first pressure plate 50 press the first and second friction plates 47 and 48. The centrifugal force, however, acts also on the oil in the canceller chamber 54 to cancel the undesired force making the first pressure plate 50 press the first and second friction plates 47 and 48.

The second clutch 38 is disposed side by side with the first clutch 37 on the axial line of the second main shaft 27. The first clutch 37 is sandwiched between the second clutch 38 and the primary reduction apparatus 40. The second clutch 38 is connected to the first, the third, and the fifth speed gear trains G1, G3, and G5 via the second main shaft 27.

As shown in FIG. 4, the second clutch 38 includes the clutch outer member 39, a second clutch inner member 56, multiple third friction plates 57, multiple fourth friction plates 58, a second pressure-receiving plate 59, a second pressure plate 60, and a second coil spring 61.

The second clutch inner member 56 is surrounded coaxially by the clutch outer member 39, and is coupled to the second main shaft 27 so as to be inoperable to rotate independently of the second main shaft 27. The third friction plates 57 are engaged with the clutch outer member 39 while the third friction plates 57 are inoperable to rotate independently of the clutch outer member 39, but are operable to move in the axial direction. The fourth friction plates 58 are engaged with the second clutch inner member 56, while the fourth friction plates 58 are inoperable to rotate independently of the second clutch inner member 56, but are operable to move in the axial direction.

The third friction plates 57 and the fourth friction plates 58 are laid alternately over one another. The second pressure-receiving plate 59 is disposed on the second clutch inner member 56 so as to face the third friction plates 57 and the fourth friction plates 58, which are laid alternately over one another. The second pressure plate 60 and the second pressure-receiving plate 59 sandwich alternately laid the third friction plates 57 and the fourth friction plates 58 therebetween. The second coil spring 61 biases the second pressure plate 60 towards a side in the axial direction where the second pressure plate 60 is positioned more away from the second pressure-receiving plate 59.

An end-wall member 63 is fixed onto the second clutch inner member 56 while a second hydraulic chamber 62 facing the back-side surface of the second pressure plate 60 is formed between the end-wall member 63 and the second pressure plate 60. As the hydraulic pressure in the second hydraulic chamber 62 increases, the second pressure plate 60 acts so as to pressure the third friction plates 57 and the fourth friction plates 58 between the second pressure plate 60 and the second pressure-receiving plate 59.

Accordingly, the second clutch 38 gets connected to the second main shaft 27 so as to transmit the rotational driving power from the crankshaft 12 to the second main shaft 27. In addition, a canceller chamber 64 facing the front-side surface of the second pressure plate 60 is formed between the second clutch inner member 56 and the second pressure plate 60. The second coil spring 61 is installed in the canceller chamber 64 while the capacity of the second hydraulic chamber 62 is reduced as a result of the spring force of the second coil spring 61.

Moreover, the canceller chamber 64 is communicably connected to a second oil passage 73 (described later). Here, centrifugal force due to the rotation acting on the oil in the second hydraulic chamber 62 under reduced pressure might generate a force causing the second pressure plate 60 to press the third and fourth friction plates 57 and 58. The centrifugal force, however, acts also on the oil in the canceller chamber 64 to cancel the undesired force making the second pressure plate 60 press the third and fourth friction plates 57 and 58.

Additionally, protruding portions 47a and 57a are formed on the outer circumferential edges of the corresponding ones of the first and third friction plates 47 and 57 of the first and second clutches 37 and 38, respectively. The protruding portions 47a and 57a thus formed are to be fitted into groove portions 39a of the clutch outer member 39. The protruding portions 47a and 57a are formed so as to protrude in the radial directions from the outer circumferential edges of the corresponding ones of the first friction plates 47 and 57. In addition, the multiple protruding portions 47a and 57a are disposed substantially in an equidistant manner in the circumferential direction.

As shown in FIG. 4, the clutch outer member 39 is a cylindrical member with one of its two ends being closed and with the other end being open. The groove portions 39a are formed in the internal circumferential surface 10s of the clutch outer member 39. As shown in FIGS. 3 and 4, as seen in cross-section, the inner circumferential surface 10s of the clutch outer member 39 extends in a direction which is substantially parallel to the central axis of the clutch outer member. The protruding portions 47a of the first friction plates 47, and the protruding portions 57a of the third friction plates 57 are fitted into the groove portions 39a. The groove portions 39a are formed in the cylindrical portion of the clutch outer member 39 so as to extend in the axial direction. In addition, the multiple groove portions 39a are disposed substantially in an equidistant manner in the circumferential direction.

In the twin clutch apparatus 10 constructed as described, hereinabove, the protruding portions 47a of the first friction plates 47, and the protruding portions 57a of the third friction plates 57 are fitted, with clearance, into the groove portions 39a of the clutch outer member 39. This allows the movement of the first friction plates 47, and the third friction plates 57 in the axial direction of the clutch outer member 39. Meanwhile, the engagement of the protruding portions 47a and 57a of the first and third friction plates 47 and 57, with respective groove portions 39a of the clutch outer member 39 prevents the first and third friction plates 47 and 57 from rotating independently of the clutch outer member 39.

In addition, as shown in FIG. 5, each of the groove portions 39a of the clutch outer member 39 is formed in a shape with its width gradually widening in a circumferential direction of the clutch outer member as the groove extends axially outwardly towards the open-side of the clutch outer member 39. Meanwhile, each of the protruding portions 57a formed in the third friction plates 57 of the second clutch 38, which are disposed on the open-end side of the clutch outer member 39, has a width "X" in a circumferential direction that is greater than a width "Y" in a circumferential direction of each of the protruding portions 47a formed in the first friction plates 47 of the first clutch 37, disposed on the closed-end side of the clutch outer member 39.

Moreover, as shown in FIG. 5, in an illustrative embodiment, each of the third friction plates 57 and the fourth friction plates 58 of the second clutch 38, which is connected to the first speed gear train G1, is made from a thicker plate than a plate used for each of the first friction plates 47 and of the second friction plates 48 of the first clutch 37.

Furthermore, as FIG. 5 shows, in the illustrative embodiment, the second clutch 38 connected to the first speed gear train G1 is disposed on the open-end side of the clutch outer member 39 while the first clutch 37 is disposed on the closed-end side of the clutch outer member 39.

Still furthermore, as shown in FIG. 4, a first, a second, and a third partition-wall members 66, 67, and 68 are attached on the inner surface side of the clutch cover 65, which covers the first and second clutches 37 and 38.

A first tubular member 70 is disposed between the second main shaft 27 and the first partition-wall member 66. Thus formed is a first oil passage 69 that leads to the first hydraulic chamber 52 of the first clutch 37. In addition, a second tubular member 72 is disposed between the second main shaft 27 and the second partition-wall member 67, and coaxially surrounds the first tubular member 70. Accordingly, a ring-shaped second oil passage 71 is formed between the second tubular member 72 and the first tubular member 70. The second oil passage 71 leads to the second hydraulic chamber 62 of the second clutch 38.

Moreover, a third tubular member 74 is disposed between the second main shaft 27 and the third partition-wall member 68, and surrounds coaxially the second tubular member 72. Accordingly, the ring-shaped second oil passage 73 is formed between the third tubular member 74 and the second tubular member 72. The second oil passage 73 leads to the canceller chamber 64 of the second clutch 38.

Here, as shown in FIGS. 2 and 4, the first and second oil passages 69 and 71 are connected to a clutch actuator 76. The hydraulic pressure of the first and second oil passages 69 and 71, i.e., the hydraulic pressure of the first and second hydraulic chamber 52 and 62, respectively, are controlled by the clutch actuator 76. The switching control of the engagement and the disengagement for the first and second clutches 37 and 38 are thus carried out by the hydraulic control performed by the clutch actuator 76.

The clutch actuator 76 includes a first electro-magnetic control valve 77, a second electro-magnetic control valve 78, and a support plate 79. The first electro-magnetic control valve 77 switches the application and the release of the hydraulic pressure to the first hydraulic chamber 52 of the first clutch 37.

Meanwhile, the second electro-magnetic control valve 78 switches the application and the release of the hydraulic pressure to the second hydraulic chamber 62 of the second clutch 38. Both of the first and the second electro-magnetic control valves 77 and 78 are disposed on the support plate 79. The support plate 79 is fixed, with multiple bolts 80 onto an attachment plate portion 65a that is formed integrally with the top portion of the clutch cover 65. In other words, the clutch actuator 76 is attached to the clutch cover 65.

As shown in FIG. 2, in the crankcase 13, an oil pump 81 is disposed below the gear transmission mechanism 25. The oil pump 81 is driven by the power transmitted from the crankshaft 12. A third oil passage 82 is formed in the clutch cover 65 so as to introduce the oil ejected from the oil pump 81 to the side of the first and second electro-magnetic control valves 77 and 78.

In an embodiment, in the clutch cover 65, oil passages form at least portions of the hydraulic-passage connecting the clutch actuator 76 to the first and second clutches 37 and 38. In this embodiment, a fourth oil passage 83 is formed in the clutch cover 65 so as to connect the first electro-magnetic control valve 77 to the first oil passage 69, which leads to the first hydraulic chamber 52 of the first clutch 37. Meanwhile, a fifth oil passage 84 is also formed in the clutch cover 65 so as to connect the second electro-magnetic control valve 78 to the second oil passage 71, which leads to the second hydraulic chamber 62 of the second clutch 38.

As shown in FIG. 3, the fourth speed gear train G4, the sixth speed gear train G6, and the second speed gear train G2 are disposed between the first main shaft 26 and the counter shaft 28, so as to be arranged in this order from the side opposite to the side where the first and second clutches 37 and 38 are located.

The second speed gear train G2 includes a second speed drive gear 87 and a second speed driven gear 88 that meshes with the second speed drive gear 87. The second speed drive gear 87 is formed integrally with the first main shaft 26. Meanwhile, the second speed driven gear 88 is movably supported on the counter shaft 28, and is allowed to freely rotate independently of the counter shaft 28.

The sixth speed gear train G6 includes a sixth speed drive gear 89 and a sixth speed driven gear 90 that meshes with the sixth speed drive gear 89. The sixth speed drive gear 89 is movably supported on the first main shaft 26, and is allowed to freely rotate independently of the first main shaft 26. Meanwhile, the sixth speed driven gear 90 is movably supported on the counter shaft 28. The sixth speed driven gear 90 is operable to move in the axial direction, but is inoperable to rotate independently of the counter shaft 28.

The fourth speed gear train G4 includes a fourth speed drive gear 91 and a fourth speed driven gear 92 that meshes with the fourth speed drive gear 91. The fourth speed drive gear 91 is movably supported on the first main shaft 26. The fourth speed drive gear 91 is operable to move in the axial direction, but is inoperable to rotate independently of the first main shaft 26. Meanwhile, the fourth speed driven gear 92 is movably supported on the counter shaft 28, and is allowed to freely rotate independently of the counter shaft 28.

A first shifter 93 is movably supported on the counter shaft 28 between the second speed driven gear 88 and the fourth speed driven gear 92. The first shifter 93 is operable to move in the axial direction, but is inoperable to rotate independently of the counter shaft 28. The first shifter 93 is capable of switching from one state to another among the following states: a state where the first shifter 93 is engaged with the second speed driven gear 88; a state where the first shifter 93 is engaged with the fourth speed driven gear 92; and a state where the first shifter 93 is engaged with neither the second speed driven gear 88 nor the fourth speed driven gear 92, that is, a neutral state.

In addition, the sixth speed driven gear 90 is formed integrally with the first shifter 93. A second shifter 94 is movably supported on the first main shaft 26. The second shifter 94 is operable to move in the axial direction, but is inoperable to rotate independently of the first main shaft 26. In addition, the fourth speed drive gear 91 is formed integrally with the second shifter 94. The second shifter 94 is capable of switching the engagement of itself with and the disengagement of itself from the sixth speed drive gear 89.

While the second shifter 94 is not engaged with the sixth speed drive gear 89, the engagement of the first shifter 93 with the second speed driven gear 88 establishes the second speed gear train G2. While the second shifter 94 is not engaged with the sixth speed drive gear 89, the engagement of the first shifter 93 with the fourth speed driven gear 92 establishes the fourth speed gear train G4. While the first shifter 93 is in a neutral state, the engagement of the second shifter 94 with the sixth speed drive gear 89 establishes the sixth speed gear train G6.

In addition, as shown in FIG. 3, the first speed gear train G1, the fifth speed gear train G5, and the third speed gear train G3 are disposed between the counter shaft 28 and the portion of the second main shaft 27 (that sticks out beyond the left-hand end portion of the first main shaft 26), so as to be arranged in this order from the side opposite to the side where the first and second clutches 37 and 38 are located.

The third speed gear train G3 includes a third speed drive gear 95 and a third speed driven gear 96 that meshes with the third speed drive gear 95. The third speed drive gear 95 is movably supported on the second main shaft 27. The third speed drive gear 95 is operable to move in the axial direction, but is inoperable to rotate independently of the second main shaft 27. Meanwhile, the third speed driven gear 96 is movably supported on the counter shaft 28, and is allowed to freely rotate independently of the counter shaft 28.

The fifth speed gear train G5 includes a fifth speed drive gear 97 and a fifth speed driven gear 98 that meshes with the fifth speed drive gear 97. The fifth speed drive gear 97 is movably supported on the second main shaft 27, and is allowed to freely rotate independently of the second main shaft 27. Meanwhile, the fifth speed driven gear 98 is movably supported on the counter shaft 28. The fifth speed driven gear 98 is operable to move in the axial direction, but is inoperable to rotate independently of the counter shaft 28.

The first speed gear train G1 includes a first speed drive gear 99 and a first speed driven gear 100 that meshes with the first speed drive gear 99. The first speed drive gear 99 is formed integrally with the second main shaft 27. Meanwhile, the first speed driven gear 100 is movably supported on the counter shaft 28, and is allowed to freely rotate independently of the counter shaft 28.

A third shifter 101 is movably supported on the second main shaft 27. The third shifter 101 is operable to move in the axial direction, but is inoperable to rotate independently of the second main shaft 27. In addition, the third speed drive gear 95 is formed integrally with the third shifter 101. The third shifter 101 is capable of switching the engagement of itself with and the disengagement of itself from the fifth speed drive gear 97.

Moreover, a fourth shifter 102 is movably supported on the counter shaft 28 between the third speed driven gear 96 and the first speed driven gear 100. The fourth shifter 102 is operable to move in the axial direction, but is inoperable to rotate independently of the counter shaft 28.

Further, the fourth shifter 102 is capable of switching from one to another among the following states: a state where the fourth shifter 102 is engaged with the third speed driven gear 96; a state where the fourth shifter 102 is engaged with the first speed driven gear 100; and a state where the fourth shifter 102 is engaged with neither the third speed driven gear 96 nor the first speed driven gear 100, that is, a neutral state. In addition, the fifth speed driven gear 98 is formed integrally with the fourth shifter 102.

While the third shifter 101 is not engaged with the fifth speed drive gear 97, the engagement of the fourth shifter 102 with the first speed driven gear 100 establishes the first speed gear train G1. While the third shifter 101 is not engaged with the fifth speed drive gear 97, the engagement of the fourth shifter 102 with the third speed driven gear 96 establishes the third speed gear train G3. While the fourth shifter 102 is in a neutral state, the engagement of the third shifter 101 with the fifth speed drive gear 97 establishes the fifth speed gear train G5.

The first through fourth shifter 93, 94, 101, and 102 are held respectively by first to fourth shift forks 103, 104, 105, and 106, and are allowed to rotate freely. When the first through fourth shift forks 103, 104, 105, and 106 are driven to move in the axial direction of the first main shaft 26, the second main shaft 27, and the counter shaft 28, the first to fourth shifter 93, 94, 101, and 102 are moved sliding in the axial direction.

As shown in FIG. 1, the first through fourth shift forks 103, 104, 105, and 106 are engaged with the outer circumferential surface of a shift drum 107. The shift drum 107 with an axial line being in parallel to the crankshaft 12 is movably supported by the crankcase 13, and is allowed to rotate freely. The rotational movement of the shift drum 107 is responded by a sliding movement of each of the shift forks 103 to 106 in the axial direction.

A shift actuator 108 equipped with an electric motor 109 drives the shift drum 107 to move rotationally. The shift actuator 108 is disposed on the side surface of the crankcase 13 at a position opposite to the side where the clutch cover 65 is coupled to the crankcase 13.

As has been described hereinabove, the twin clutch apparatus 10 according to this embodiment is constructed as follows.

Each of the groove portions 39*a* of the clutch outer member 39 is formed with its width gradually widening towards the opening of the clutch outer member 39. While the second clutch 38 is disposed on the open-end side of the clutch outer member 39, the first clutch 37 is disposed on the closed-end side of the clutch outer member 39. The width "X" of each of the protruding portions 57*a* formed in the third friction plates 57 of the second clutch 38 is greater than the width "Y" of each of the protruding portions 47*a* formed in the first friction plates 47 of the first clutch 37.

Here, the first and second clutches 37 and 38 share the single, common clutch outer member 39. This results in the widening of the width of each of the groove portions 39*a* of the clutch outer member 39. Nevertheless, the width X of each protruding portion 57*a* of the third friction plates 57 is made larger to fit even to the widened groove portions 39*a*.

Accordingly, the clearance between each groove portion 39*a* of the clutch outer member 39 and each protruding portion 57*a* of the third friction plates 57 can be managed within an appropriate range. As a consequence, the force and the sound caused by the impact between the clutch outer member 39 and the third friction plates 57 can be reduced.

In addition, the twin clutch apparatus 10 is constructed so that each plate for the third friction plates 57 of the second clutch 38 connected to the first speed gear train G1 is thicker than each plate for the first friction plates 47 of the first clutch 37. A heavier load is applied, during the deceleration or at the start of the vehicle, to the second clutch 38 that is connected to the first speed gear train G1.

Moreover, the protruding portions 57a formed in the third friction plates 57 of the second clutch 38 hit the groove portions 39a of the clutch outer member 39. According to the twin clutch apparatus 10 of this embodiment, however, an improvement can be achieved in the durability of the protruding portions 57a towards the above-mentioned impact since protruding portion of the third friction plates 57 have higher thickness.

Further, the twin clutch apparatus 10 according to the illustrated embodiment is constructed so that the second clutch 38 connected to the first speed gear train G1 is disposed on the open-end side of the clutch outer member 39. Accordingly, while a heavier load is applied, at the deceleration or the start of the vehicle, to each third friction plate 57 of the second clutch 38 connected to the first speed gear train G1, each of the third friction plates 57 can be made thicker.

In addition, each of the protruding portions 57a can be made larger than each of the protruding portions 47a formed in the first friction plates 47 of the first clutch 37. Thus, even when the protruding portions 57a formed in the third friction plates 57 of the second clutch 38 connected to the first speed gear train G1 hit the groove portions 39a of the clutch outer member 39, an improvement can be achieved in the durability of the protruding portions 57a towards the above-mentioned impact, according to the twin clutch apparatus 10 of the present invention.

It should be noted that the examples described in the above-mentioned embodiment is not the only form of carrying out the present invention. Various modifications can be made as needed without departing the essence of the present invention.

For example, in the embodiment described above, each of the first to fourth friction plates 47, 48, 57, and 58 of the first and second clutches 37 and 38 has 5 plates. In total, 20 friction plates 47, 48, 57, and 58 are used. The number of the friction plates 47, 48, 57, and 58, however, can be either increased or decreased based on the output of the engine EA.

In addition, in the embodiment described above, each of the third and fourth friction plates 57 and 58 of the second clutch 38 is thicker than each of the first and second friction plates 47 and 48 of the first clutch 37. This, however, is not the only arrangement. Instead, only the third friction plates 57 may be made thicker, if desired.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A twin clutch apparatus comprising:
a pair of clutches disposed between a crankshaft and a transmission unit, the pair of clutches being operable to selectively engage or disengage transmission of a rotational driving power from the crankshaft to the transmission unit;
the pair of clutches being arranged side by side on a shared axial line, each of the pair of clutches including at least one friction plate having a plurality of protruding portions protruding in a radial direction on an outer circumferential edge thereof; and
a clutch outer member shared by the pair of clutches, the clutch outer member being a cylindrical member having an open-end side, and a closed end portion defining a closed-end side, the clutch outer member having a central axis and an inner wall surface which, as seen in cross-section, extends in a direction substantially parallel to the central axis; the clutch outer member having a plurality of groove portions formed in an internal circumferential surface thereof, said groove portions extending in an axial direction of the clutch outer member, wherein:

said at least one friction plate is operable to engage with the clutch outer member by engaging the protruding portions thereof with the groove portions of the clutch outer member, with a clearance formed therebetween such that said at least one friction plate is operable to move in the axial direction and is inoperable to rotate independently of the clutch outer member;

each of the groove portions of the clutch outer member is formed with a tapered shape having a variable width in a circumferential direction of the clutch outer member, wherein the width of the groove gradually increases in the circumferential direction as the groove extends from the closed-end side towards the open-end side thereof;

one of the pair of clutches is disposed on the open-end side of the clutch outer member, and the other of the pair of clutches is disposed on the closed-end side of the clutch outer member, and a width in a circumferential direction of each of the protruding portions formed on said at least one friction plate of the clutch disposed on the open-end side is greater than a width in a circumferential direction of each of the protruding portions formed on said at least one friction plate of the clutch disposed on the closed-end side.

2. The twin clutch apparatus according to claim 1, wherein a thickness of said at least one friction plate of one clutch of the pair of clutches, that is operable to connect with a first-speed gear train of a transmission unit, is greater than a thickness of said at least one friction plate of the other clutch of the pair of clutches.

3. The twin clutch apparatus according to claim 2, wherein the clutch that is operable to connect with the first-speed gear train is disposed on the open-end side of the clutch outer member.

4. A power unit for a motorcycle, said power unit comprising
an engine having a crankshaft;
a transmission unit having a gear transmission mechanism;
a twin clutch assembly disposed between the crankshaft and the transmission unit; said twin clutch assembly operable to transmit rotational power from the crankshaft to the gear transmission mechanism of the transmission unit;
said twin clutch assembly comprising
a first clutch;
a second clutch disposed adjacent to said first clutch; and
a cylindrical clutch outer member shared by said first clutch and second clutch; said cylindrical clutch outer member having an open-end side and a closed-end side, the clutch outer member having a central axis and an inner wall surface which, as seen in cross-section, extends in a direction substantially parallel to the central axis;

wherein:

each of said first and second clutches includes a plurality of friction plates, each of said plurality of friction plates having a plurality of protruding portions formed on an outer circumferential edge thereof;

said clutch outer member includes a plurality of groove portions formed therein corresponding to said plurality of protruding portions of the plurality of friction plates;

said friction plates of each of said first clutch and said second clutch are operable to engage with said clutch outer member by engaging the protruding portions in the groove portions of the clutch outer member with a clearance formed therebetween such that the friction plates are operable to move in the axial direction and are inoperable to rotate independently of the clutch outer member; and each of the groove portions is formed in the clutch outer member with a tapered shape so as to have a width thereof gradually increasing in a circumferential direction of the clutch outer member, as the groove extends from said closed-end side towards the open-end side thereof.

5. A power unit for a motorcycle according to claim 4, wherein said second clutch is disposed towards the open-end side of the clutch outer member, and said first clutch is disposed towards the closed-end side of the clutch outer member.

6. A power unit for a motorcycle according to claim 4, wherein a width in a circumferential direction of each of said protruding portions of said friction plates of the second clutch is greater than a width in a circumferential direction of each of said protruding portions of said friction plates of the first clutch.

7. A power unit for a motorcycle according to claim 4, wherein said groove portions formed in the clutch outer member extend in an axial direction in the internal circumferential surface thereof.

8. A power unit for a motorcycle according to claim 4, wherein a thickness of each of said friction plates of the second clutch is greater than a thickness of each of said friction plates of the first clutch.

9. A power unit for a motorcycle according to claim 4, wherein said gear transmission mechanism includes a first speed gear train; and wherein said second clutch is operatively connected to said first speed gear train.

10. A power unit for a motorcycle according to claim 4, wherein a number of said plurality of friction plates of said first clutch is equal to that of said second clutch.

11. A power unit for a motorcycle according to claim 10, wherein said number of said plurality of friction plates of said first clutch is equal to five.

12. A vehicle comprising an engine, a transmission unit, and a clutch assembly disposed between said engine and said transmission unit;

said engine comprising a crankshaft;

said transmission unit comprising a gear transmission mechanism;

said clutch assembly operable to transmit rotational power from the crankshaft to the gear transmission mechanism of the transmission unit;

said clutch assembly comprising
a first clutch;
a second clutch disposed adjacent to said first clutch; and
a cylindrical clutch outer member shared by said first clutch and second clutch; said clutch outer member having an open-end side and a closed-end side, the clutch outer member having a central axis and an inner wall surface which, as seen in cross-section, extends in a direction substantially parallel to the central axis;

wherein:

each of said first and second clutches includes a plurality of friction plates, each of said plurality of friction plates having a plurality of protruding portions formed on an outer circumferential edge thereof;

the clutch outer member includes a plurality of groove portions formed therein corresponding to said plurality of protruding portions of the plurality of friction plates;

the friction plates of each of said first clutch and said second clutch are operable to engage with said clutch outer member by engaging the protruding portions thereof in the groove portions of the clutch outer member with a clearance formed therebetween such that the friction plates are operable to move in the axial direction and are inoperable to rotate independently of the clutch outer member;

each of the groove portions is formed in the clutch outer member with a tapered shape so as to have a width thereof gradually increasing in a circumferential direction of the clutch outer member, as the groove extends from said closed-end side towards the open-end side thereof.

13. A vehicle according to claim 12, wherein
said second clutch is disposed towards the open-end side of the clutch outer member, and
said first clutch is disposed towards the closed-end side of the clutch outer member.

14. A vehicle according to claim 12, wherein a width in a circumferential direction of each of said protruding portions of said friction plates of the second clutch is greater than a width in a circumferential direction of each of said protruding portions of said friction plates of the first clutch.

15. A vehicle according to claim 12, wherein said groove portions formed in the clutch outer member extend in an axial direction in the internal circumferential surface thereof.

16. A vehicle according to claim 12, wherein a thickness of each of said friction plates of the second clutch is greater than a thickness of each of said friction plates of the first clutch.

17. A vehicle according to claim 12, wherein said gear transmission mechanism includes a first speed gear train; and wherein said second clutch is operatively connected with said first speed gear train.

18. A vehicle according to claim 12, wherein a number of said plurality of friction plates of said first clutch is equal to that of said second clutch.

19. A power unit for a motorcycle according to claim 18, wherein said number of said plurality of friction plates of said first clutch is equal to five.

20. A vehicle according to claim 12, wherein an overall thickness of said second clutch is greater than an overall thickness of said first clutch.

* * * * *